US005615385A

United States Patent [19]
Fetterman et al.

[11] Patent Number: 5,615,385
[45] Date of Patent: Mar. 25, 1997

[54] METHOD AND APPARATUS FOR ZERO EXTENSION AND BIT SHIFTING TO PRESERVE REGISTER PARAMETERS IN A MICROPROCESSOR UTILIZING REGISTER RENAMING

[75] Inventors: Michael A. Fetterman; Andrew F. Glew, both of Hillsboro; Glenn J. Hinton, Portland; David B. Papworth, Beaverton; Robert P. Colwell, Portland, all of Oreg.

[73] Assignee: Intel Corporation, Santa Clara, Calif.

[21] Appl. No.: 565,646

[22] Filed: Nov. 29, 1995

Related U.S. Application Data

[60] Division of Ser. No. 333,397, Nov. 2, 1994, which is a continuation-in-part of Ser. No. 204,069, Mar. 1, 1994, abandoned.

[51] Int. Cl.⁶ .................................................... G06F 7/00
[52] U.S. Cl. .................... 395/800; 395/394; 364/DIG. 1; 364/255.1; 364/255.7; 364/259
[58] Field of Search ..................................... 395/800, 375

[56] References Cited

U.S. PATENT DOCUMENTS

| | | | |
|---|---|---|---|
| 4,959,779 | 9/1990 | Weber et al. | 364/200 |
| 5,185,872 | 2/1993 | Arnold et al. | 395/375 |
| 5,265,213 | 11/1993 | Weiser et al. | 395/375 |
| 5,345,569 | 9/1994 | Tran | 395/375 |
| 5,371,684 | 12/1994 | Iadonato et al. | 364/491 |
| 5,420,992 | 5/1995 | Killian et al. | 395/375 |
| 5,442,577 | 8/1995 | Cohen | 364/716 |
| 5,467,476 | 11/1995 | Kawasaki | 395/800 |
| 5,471,633 | 11/1995 | Colwell et al. | 395/800 |
| 5,497,493 | 3/1996 | Colwell et al. | 395/800 |

FOREIGN PATENT DOCUMENTS

| | | |
|---|---|---|
| 2251320 | 7/1992 | United Kingdom. |
| 93/01545 | 1/1993 | WIPO. |

OTHER PUBLICATIONS

Johnson, Mike, "ResultForwarding", *Superscalar Microprocessor Design;* Prentice-Hall, pp. 122–125 (1991).
Popescu, et al., "The Metaflow Architecture", *IEEE Micro,* pp. 10–13, 63–73 (Jun. 1991).
Patt et al., "HPS, A New Microarchitecture: Rationale and Introduction," pp. 103–108 (1985).
Patt et al., "Critical Issues Regarding HPS, A High Performance Microarchitecture," pp. 109–116 (1985).
Patt et al., "Experiments with HPS, A Restricted Data Flow Microarchitecture for High Performance Computers" pp. 254–258 (1986).
Johnson, Mike, *Superscalar Microprocessor Design,* pp. 127–146, (1991).
Intel, "i750, i860, i960 Processors and Related Products", pp. 2–1–2–47 and pp. 3–234–3–245 (1993).
McGeady, "The i960CA Superscalar Implementation of 80960 Architecture," *IEEE,* pp. 232–240 (1990).
Hinton, "80960—Next Generation," *IEEE,* pp. 13–17 (1989).
Diefendorff et al., "Organization of Motorola 88110 Superscalar RISC Microprocessor," *IEEE Micro,* pp. 40–63 (1992).
Acosta et al., "An Instruction Issuing Approach to Enhancing Performance in Multiple Functional Unit Processor," *IEEE* pp. 815–818 (1986).

*Primary Examiner*—Larry D. Donaghue
*Attorney, Agent, or Firm*—Blakely, Sokoloff, Taylor & Zafman

[57] ABSTRACT

Register identification preservation in a microprocessor implementing register renaming. Multiplexing and control circuitry are implemented for manipulating data sources to be supplied to a microprocessor's functional units. The circuitry will generate zero extending for source data to an execution unit where a data source register specified is shorter than a general register size utilized by the microprocessor. Similarly, the multiplexing and control circuitry will shift bits of data from one location to another upon a source input to a functional unit in accordance with control signals designating such activity.

6 Claims, 7 Drawing Sheets

METHOD AND APPARATUS FOR ZERO EXTENSION AND BIT SHIFTING TO PRESERVE REGISTER PARAMETERS IN A MICROPROCESSOR UTILIZING REGISTER RENAMING

RELATED APPLICATION

This is a divisional of application application No. 08/333, 397, filed Nov. 2. 1994 which is a continuation in part of application No. 08/204,069 filed Mar. 1, 1994, now abandoned.

BACKGROUND OF THE INVENTION

1. Field of the Invention

The present invention relates to the field of microprocessor architecture. More specifically, the present invention relates to data bypassing and register identity preservation within complex microprocessors to increase instruction throughput.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instruction until the condition is resolved. Since the condition will not be resolved until further down the pipeline, the instruction fetch unit may not be able to fetch proper instructions.

To overcome this problem, some pipelined microprocessors use branch prediction mechanisms that predict the outcome of branches and then fetch subsequent instructions according to branch prediction. Branch prediction is achieved using a branch target buffer (BTB) to store the history of a branch instruction based upon the instruction pointer or address of that instruction. Every time a branch instruction is fetched, the branch target buffer predicts the target address of the branch using the branch history. Speculative execution is where instructions are initiated and completed before knowing if they are the correct instructions. This usually includes prediction with a BTB.

In addition to speculative execution, substantial increases in instruction throughput are achievable by implementing out-of-order dispatch of instructions to the execution units. Many experiments have confirmed that typical von Neumann code provides substantial parallelism and hence a potential performance boost by use of out-of-order execution is possible. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design* and Prentice-Hall, Inc., 1991, Chapters 3 and 7.

In a processor using a reservation station for dispatching out-of-order data-ready instructions to various functional units, there is often another buffer implemented for storing out-of-order result data from the functional units until the results may be retired in their original program order. Such a buffer may be referred to as a reorder buffer since its purpose is to reorder out-of-order result data back into original program order. A reorder buffer will generally include a number of general physical registers which are temporarily mapped, during out-of-order execution, to the logical result register for a given instruction. The problem with mapping a logical result register to a general physical register in a reorder buffer is that the parameters of the logical result registers itself may be lost. The very identity of a result register carries with it useful information that may be lost through the mapping to a general physical register. It would be desirable, and is therefore an object of the present invention, to provide a method of utilizing a logical-to-physical result register mapping for an out-of-order execution microprocessor which preserves important information about a desired logical result register.

SUMMARY OF THE INVENTION

From the foregoing, it can be appreciated that there is a need to provide a mechanism for preserving useful information about an in-order result register in an out-of-order executing microprocessor that maps result registers to physical general registers during out-of-order execution. Therefore, it is an object of the present invention to provide a method and apparatus for maintaining result register parameters in a microprocessor that implements register renaming.

These and other objects of the present invention are provided in one microprocessor embodiment which implements an allocator and a register alias table (RAT) for assigning physical destination registers for holding instruction result data. The RAT propagates control signals identifying certain parameters about the original result register specified for an instruction and the register sizes of specified source data. One particular parameter identifies the specified size of a register, another involves a location within a result register where a result is expected to be written or where source data can be found. Upon dispatch of the instruction to a functional unit, the control signals identifying the source data register parameters are also propagated from the reservation station to the functional unit for processing with the instruction.

At the front end of each of the functional units within the microprocessor is multiplexing logic for selecting the input to its associated functional unit. Functional units, in addition to receiving instructions and source data from the reservation station, may also receive source data that is bypassed from one functional unit to another. The multiplexing logic at the front ends of the functional units is incorporated with the logic for controlling this source operand bypassing. The present invention expands the functionality of the functional unit's front end multiplexing logic by providing bit manipulation circuitry responsive to the control signals associated with a specified source data register's parameters. When a data source specifies a register size smaller than the physical registers incorporated in the microprocessor's out-of-order core, the multiplexing control circuitry provides for zero extension of input source data for the high order bits being propagated to functional unit. Similarly, when a control signal associated with a source register's parameters indicates that a block of information needs to be shifted, the multiplexing logic provides for the shifting of bits upon input to the functional unit.

BRIEF DESCRIPTION OF THE DRAWINGS

The objects, features and advantages of the present invention will be apparent from the following detailed description in which.

DETAILED DESCRIPTION OF THE INVENTION

The present invention provides a mechanism for preserving certain register parameters in a microprocessor that implements register renaming. In the following description, numerous specific details are set forth such as particular data paths and specified couplings for various embodiments in order to provide a thorough understanding of the present invention. It will be appreciated, however, by one skilled in the art that the present invention may be practiced in a more general application where such advantages provided by the present invention are desired. In other instances, well-known control structures and gate level circuits have not been shown in detail in order not to obscure important aspects of the present invention. Particularly, many functions are described to be carried out by various logic and multiplexing circuits. Once the various functions have been described, a practitioner of ordinary skill in the art will be able to implement the necessary logic and multiplexing circuits without undue experimentation.

Figure 1:
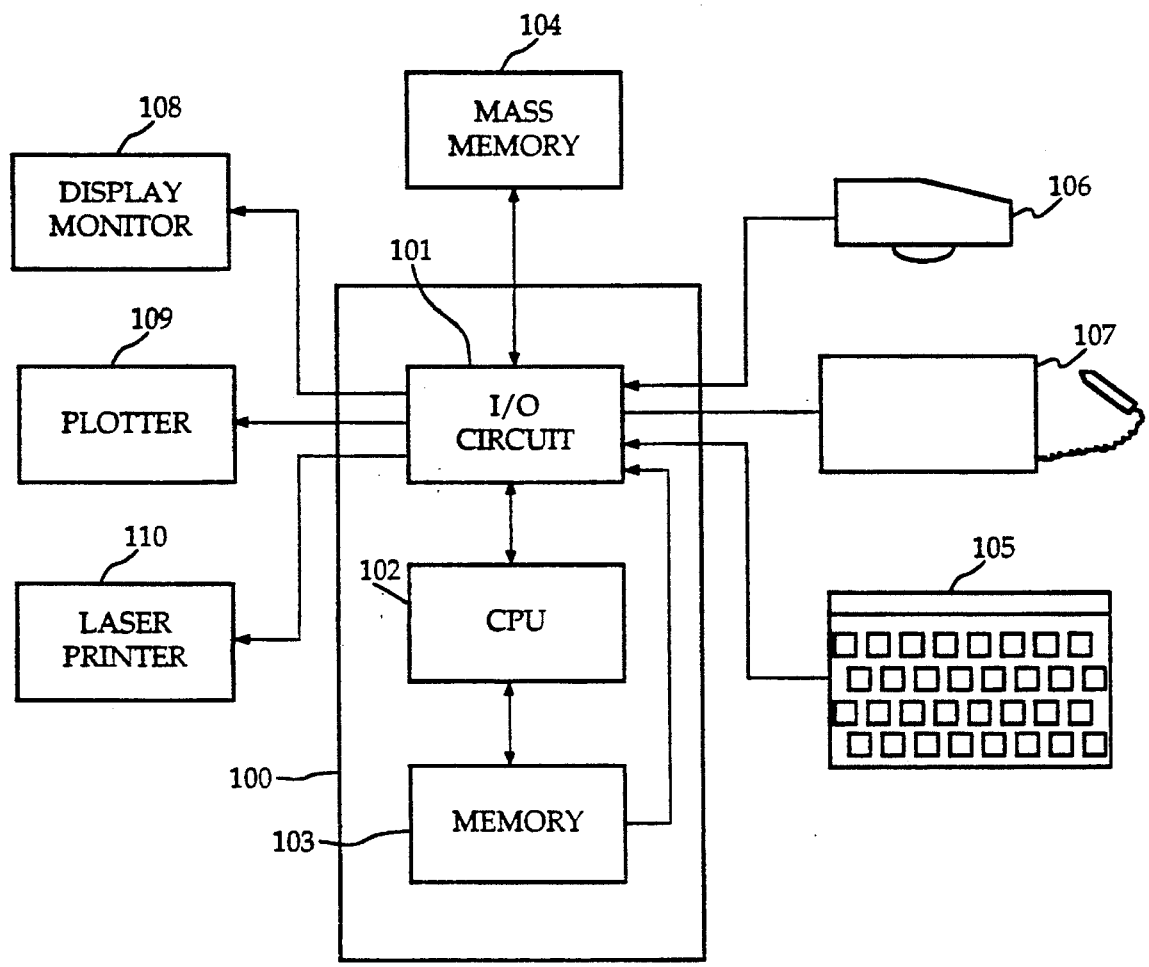
FIG. 1 illustrates a basic computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

One embodiment of the present invention is intended to be implemented in a microprocessor that executes the well-known Intel Architecture Microprocessor instruction set. The present invention may, however, be implemented in any microprocessor architecture in which it is desirable to preserve register parameters for source data. A variety of microprocessors may take advantage of the present invention whether those microprocessors occupy a single chip or more than one and regardless of the materials used to fabricate the chip including silicon or gallium arsenide.

Figure 2:
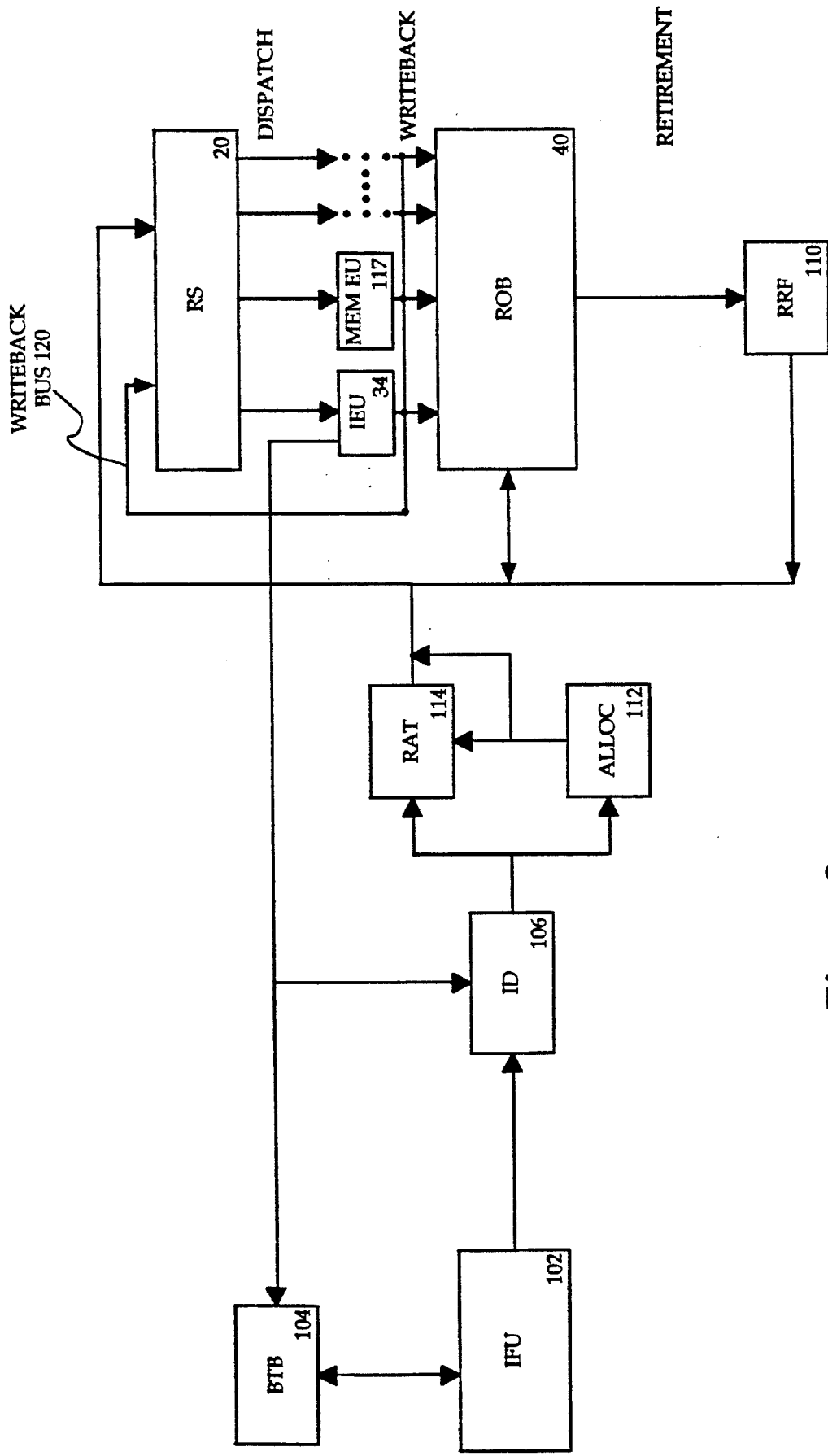
FIG. 2 is a block diagram illustrating a portion of a microprocessor incorporating the present invention.

FIG. 2 is a block diagram of one embodiment of a speculative out-of-order processor in accordance with the present invention. The processor comprises an instruction fetch unit (IFU) 102 coupled to a branch target buffer (BTB) 104 and an instruction decoder (ID) 106. Based upon the instruction pointer (IP) provided by the BTB 104 to the IFU 102, the IFU 102 fetches the macro instruction found at the address in memory (not shown) that is indicated by the IP. The instruction is decoded into one or more micro operations by the instruction decoder 106. The instruction decoder 106 transfers the stream of micro operations to a register alias table (RAT) 114 and an allocator (ALLOC) 112. In one embodiment, the instruction decoder 106 issues up to three in-order micro operations during each cycle of the processor.

The allocator 112 assigns each incoming micro operation to a location in the reorder buffer (ROB) 40, thereby mapping the logical destination address (LDST) of the micro operation to a corresponding physical destination address (PDST) in the ROB. The register alias table (RAT) 114 maintains this mapping.

The contents of a ROB register are retired to a location in a real register file (RRF) 110. The RAT 114 thus also stores a real register file valid bit (RRFV) that indicates whether the value indicated by the logical address is to be found at the physical address in the ROB or in the RRF after retirement. Based upon this mapping, the RAT 114 also associates every logical source address to a corresponding location in the ROB or the RRF (the source operand of one instruction generally must have been the destination of a previous instruction).

Each incoming micro operation is also assigned and written into an entry in the reservation station 20 by the allocator 112. The reservation station (RS) 20 assembles the micro operations awaiting execution by an appropriate execution unit, such as integer execution unit (IEU) 34 or memory execution unit (MEM EU) 117. Results are written back over result or writeback bus 120.

Figure 3:
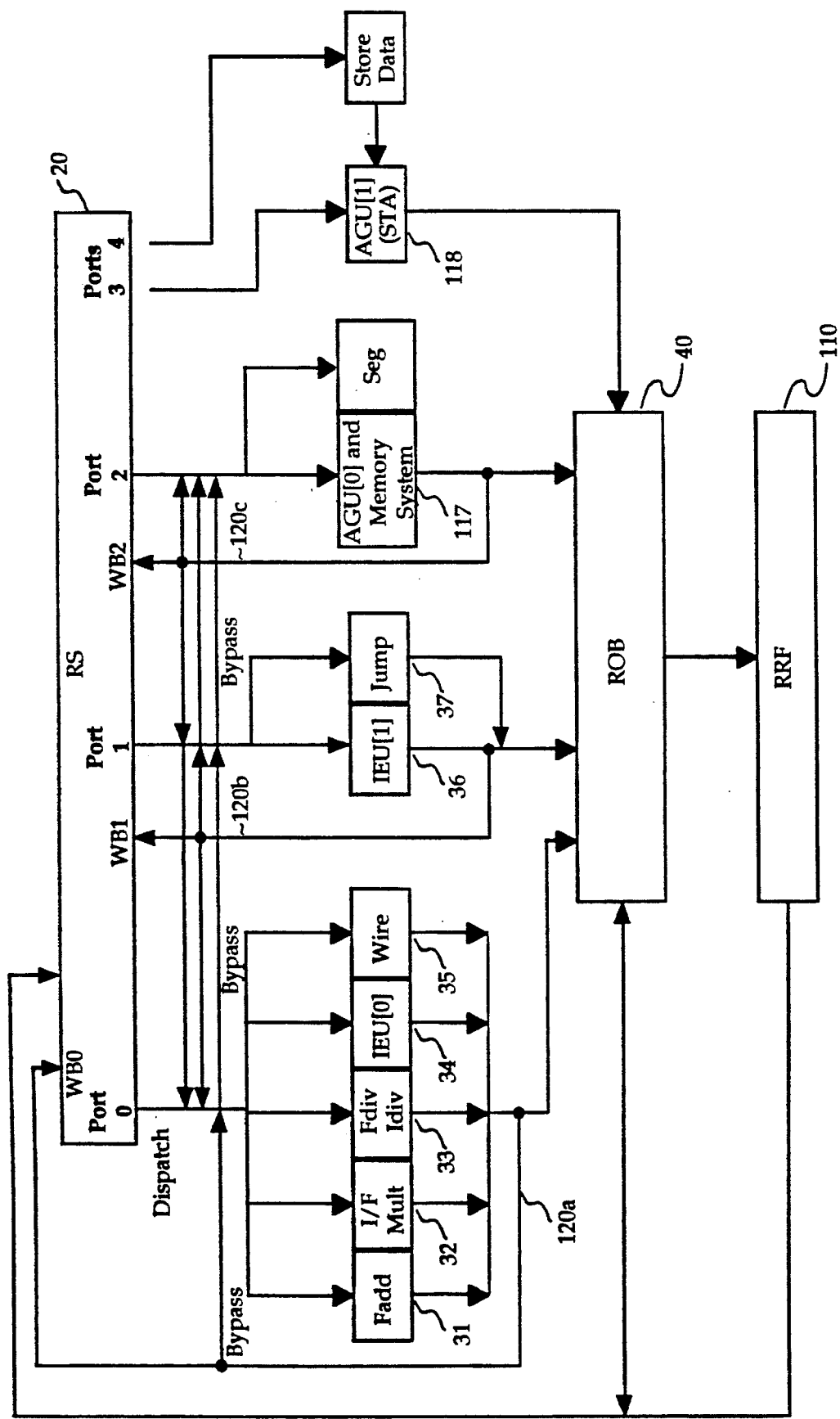
FIG. 3 illustrates a more detailed block diagram of the out-of-order core of a microprocessor incorporating one embodiment of the present invention.

FIG. 3 illustrates a more detailed portion of the microprocessor incorporating the present invention. The microprocessor implementing one embodiment of the present invention may perform out-of-order execution of instructions. The portion of the microprocessor illustrated in FIG. 3 can be considered the out-of-order core of the microprocessor. The first element of the out-of-order core illustrated in FIG. 3 is the reservation station 20. The reservation station 20 is a buffer in front of the functional units that holds micro operations that are waiting for needed resources in order to execute. These needed resources include the source data operands (that previous micro operations may not yet have created) and a functional unit with which to execute the micro operation.

The reservation station performs several functions. Its data fields serve as a temporary buffer for instructions and the source data that is or will be available. The reservation station maintains waiting instructions and is "watching" all the result/writeback buses from all the execution interfaces "looking" for source data that it needs for its micro operations. When the watched-for data arrives on the result bus 120, the reservation station writes it into the appropriate source data field.

Once all the source operands for a micro operation are in the reservation station, the reservation station determines when an appropriate execution unit is available and schedules the data ready micro operation for dispatch.

The reservation station 20 of FIG. 3 is illustrated having five dispatch ports. Functional micro operations in the embodiment illustrated will be dispatched over either Dispatch Port 0 or Dispatch Port 1. Memory operations will be dispatched through Dispatch Ports 2–4. In one embodiment of the microprocessor, there are five execution units coupled to Dispatch Port 0 from reservation station 20. These are the floating point add unit 31, the multiply unit 32 for performing integer and floating point multiplies, integer and floating point divide unit 33, integer execution unit 34, and a hybrid execution unit 35. As was described, the complex Intel Microprocessor instruction set is reduced to a simpler stream of micro operations. These micro operations, when they are dispatched from the reservation station, are operated on by the various execution units. Most applications heavily utilize the integer execution unit. Integer execution unit 34 is desired to be able to process data-ready micro operations in one clock cycle. It is therefore referred to as a single-cycle functional unit. The integer execution unit 34 receives data having a width of 32 bits. The floating point execution units 31, 32 and 33 carry out more complicated tasks when they receive data-ready micro operations. These functional units receive input streams having a width for 86 bits of source data.

In one embodiment of the present invention microprocessor, a floating point add requires three clock cycles to execute, and a floating point multiply requires five clock cycles to execute. Floating point divides and square roots, which are both carried out by the floating point divide unit 33, have variable length latencies depending upon the precision required for their result. The wire unit 35 is a hybrid execution unit implemented in one embodiment for various other instructions. It is similar to a floating point unit in that its input stream takes sources that are 86 bits wide, but it is more like an integer execution unit in that it performs its operations in a single clock cycle.

Dispatch Port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro operations common in most code, thereby enhancing performance of the overall system. Of course, alternative microprocessors may incorporate more or fewer execution units depending upon design objectives.

After an execution unit executes a micro operation, it writes back the result to the reorder buffer 40 over writeback bus 120a or 120b. The reorder buffer 40 serves as the place where the results of out-of-order operations are collected so that they can later be committed to machine state in strict von Neumann order the committed state registers being in the RRF 110. Thus, the reorder buffer is where the out-of-order core reassembles the instruction stream into its program order, before commitment to state. At the same time that execution units writeback to the reorder buffer 40, they may simultaneously writeback to the reservation station 20. It may be that the result of an execution unit's operation provides a source operand needed for the execution of another micro operation waiting in the reservation station. Similarly, a result from one execution unit may be immediately bypassed to another, or the same execution unit if a dependent instruction has already been dispatched.

Coupled to the reservation station 20 through Dispatch Ports 2, 3 and 4 are the memory system execution units. The AGU[0] and memory system cluster 117 calculates memory addresses for loads and processes them in the manner to be described more fully below. The load result is then provided to the ROB 40 and to the reservation station 20 through writeback path 120c. Similarly, stores are propagated through Dispatch Ports 3 and 4 of the reservation station 20. The AGU[1] unit 118 calculates store addresses and propagates them through the memory system to be described below.

Figure 4:
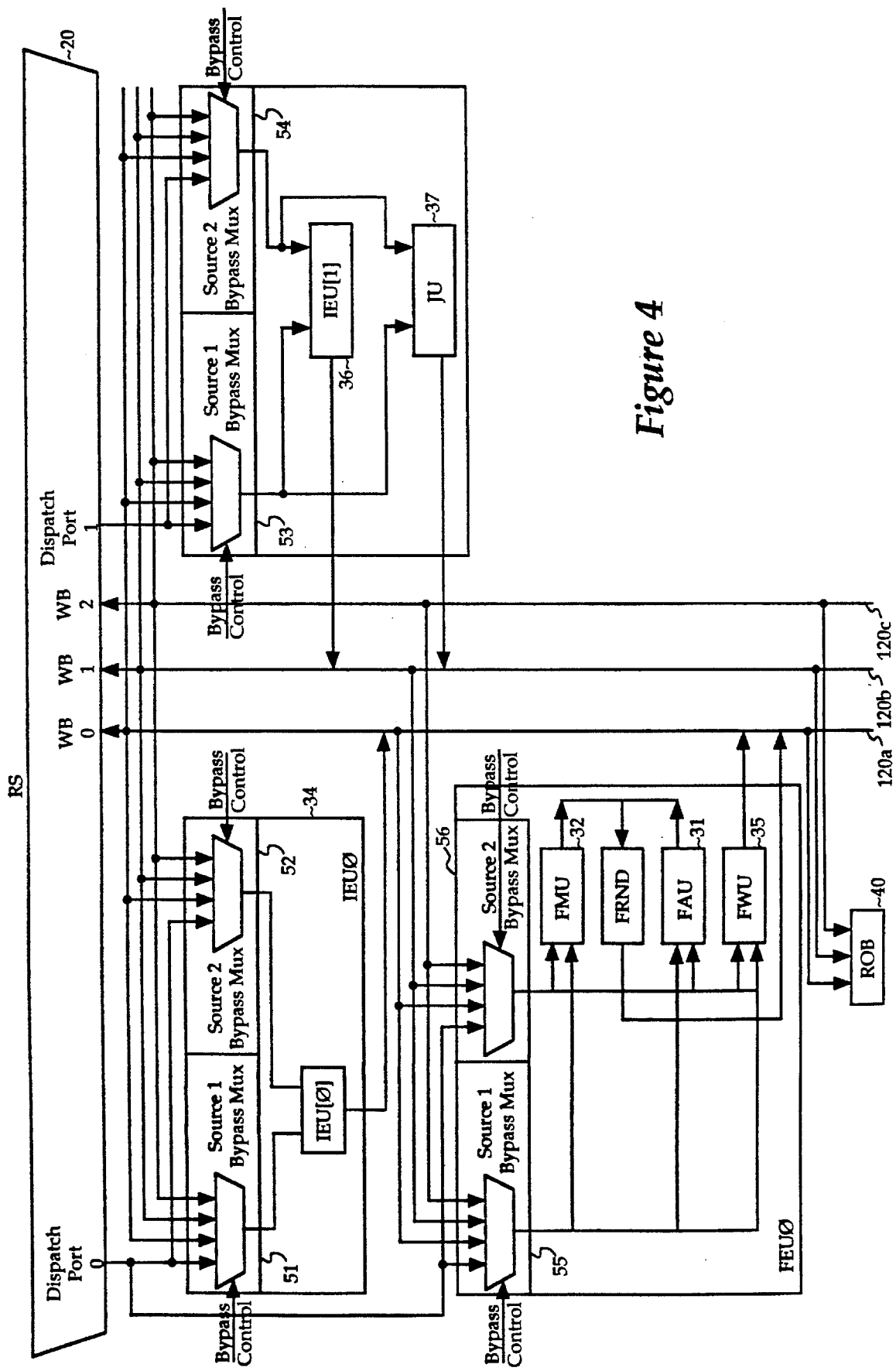
FIG. 4 illustrates a more detailed portion of the out-of-order core of a microprocessor implementing bypassing circuitry.

Referring now to FIG. 4, a more detailed portion of the out-of-order core of a microprocessor implementing the present invention is shown. In FIG. 4, only those execution units which are coupled to dispatch ports 0 and 1 are shown. In the discussion which follows, it should be understood that the same principles and implementation may be applied to the functional units which are supplied instructions through dispatch ports 2, 3 and 4 of the above-described microprocessor embodiment.

As was described above, IEU[0] and a floating point execution unit cluster receive instructions through dispatch port 0 of the reservation station 20. IEU[1] and the Jump Unit 37 receive instructions through dispatch port 1. The functional units coupled to dispatch port 0 write back result data over writeback bus 120a which is coupled to the reservation station 20 through writeback port 0 and to the ROB 40. IEU[1] and the Jump Unit 37 which receive instructions from dispatch port 1 write back result data over writeback bus 120b which is coupled to the reservation station 20 through writeback port 1. In one embodiment, the microprocessor includes a third writeback bus 120c which the memory functional units use to write back result data. Writeback bus 120c is coupled to the reservation station 20 through writeback port 2.

It can be seen from FIG. 4 that the out-of-order core of the illustrated microprocessor is provided with bypass multiplexing logic used to implement the present invention. For example, bypassing multiplexers 51 and 52 are coupled within the input path of IEU[0]. Similarly, bypassing multiplexers 53 and 54 are coupled to the input path of IEU[1]. Finally, as shown in FIG. 4, bypass multiplexers 55 and 56 are coupled to the input path of all the floating point units which receive instructions through dispatch port The bypass multiplexers shown in FIG. 4 are each coupled to receive source 1 and source 2 data from the reservation station dispatch port to which they are coupled as well as from each of the writeback buses. It should be understood that with respect to FIG. 4, only the supplying of source 1 and source 2 operand data to the execution units is illustrated. When the reservation station 20 dispatches an instruction to an execution unit, it supplies an instruction code as well as the source 1 and source 2 operands (unless one or both are being bypassed to the execution unit input from one of the writeback buses) as well as other control signals.

It can be seen in FIG. 4 that the bypassing multiplexers receive select line enable signals labeled "Bypass Control". The bypass control signals are provided by the reservation station 20 for controlling the enabling of the bypass multiplexers. The reservation station may arrange for bypassing of one, both, or none of the sources for a microoperation. The reservation station logic determines when an operand for a dependent instruction is going to be written back over one of the writeback buses as result data from one of the functional units. For example, if an instruction is pending in the reservation station and has all of its needed components except for one source operand, and that source operand is going to be the result of a previously dispatched instruction, the reservation station may schedule the dispatch of the waiting instruction in advance of the receipt of the needed source operand. The reservation station then dispatches the waiting instruction and the source operand that was already stored in the reservation station to the designated functional unit for that instruction. Simultaneously with the dispatch of the instruction from the reservation station to the execution unit, the reservation station provides a control signal to the appropriate bypassing multiplexer for the receiving execution unit, directing the result data from the write back bus to be provided to the execution unit as the needed source operand input.

If, for example, an operand already stored in the reservation station 20 is the source 1 operand for an instruction to be dispatched to IEU[0], the reservation station will dispatch the opcode and that source operand to the execution unit. The reservation station will also provide a bypass control signal to the source 1 bypass multiplexer 51 instructing that multiplexer to propagate the source 1 operand received from the reservation station dispatch port 0 to the IEU[0] source 1 operand input. Further, if the second needed source operand is result data from a previously executing instruction that is being written back from execution unit IEU[1], the reservation station propagates a bypass control signal to the source 2 bypass multiplexer 52 directing it to route the result data from writeback bus 120b to the source 2 operand input of IEU[0]. This allows the pending instruction in the reservation station to be dispatched earlier then if it were necessary to wait for the result data from IEU[1] to be written into the reservation station before dispatching to IEU[0].

In the illustrated embodiment of the bypassing arrangement, two sets of source 1 and source 2 bypass multiplexers are provided for the functional units receiving instructions through dispatch port 0 of the reservation station 20. The IEU[0] functional unit has its own set of source bypass multiplexers 51 and 52 while the floating point execution cluster shares the source bypass multiplexers 55 and 56. Each of these multiplexers as well as the bypass multiplexers supplied for the other functional blocks are capable of receiving data dispatched from the reservation station as well as data bypassed from any one of the writeback buses 120a, 120b or 120c. Separate bypass multiplexers are dedicated to the IEU[0] functional unit to result in less loading on the bypass multiplexer and thus a higher clock speed can be obtained. The floating point execution units are more latency tolerant, so the sharing of common bypass multiplexers 55 and 56 may be more efficient than having separate multiplexers for each unit. Alternatively, all of the execution units receiving instructions from dispatch port 0 may share one set of bypass multiplexers where speed considerations are less important. Likewise, each of the execution units receiving instructions from dispatch port 0 may have dedicated bypass multiplexers supplied.

Although FIG. 4 only illustrates the functional units and bypass multiplexers coupled through dispatch port 0 and dispatch port 1, it should be understood that bypass circuitry operating according to the same principles may be applied to the inputs of the functional units receiving instructions from dispatch ports 2, 3 and 4.

An additional feature worth noting is that when a source operand is bypassed directly to a functional unit, it is also written into the ROB 40 and offered to the reservation station 20. This is done because the result data on the write back bus may be required for more than one pending instruction in the reservation station. Further, if for example an execution unit is receiving two bypassed operands, one from writeback bus 120b as the output from IEU[1] and the other the result of a memory load data instruction being written back on writeback bus 120c, it is possible that the result of the load data instruction will not be available due to a cache miss. In that event, the result data from IEU[1] should be buffered in the reservation station with the pending instruction and allow the receiving functional unit to carry on with other instructions until the memory operation is complete. By not latching the pending data in the execution unit, and instead in the reservation station, the benefits of out-of-order execution are preserved wherein the execution unit may continue performing completely independent operations.

Register Conventions

Figure 5:
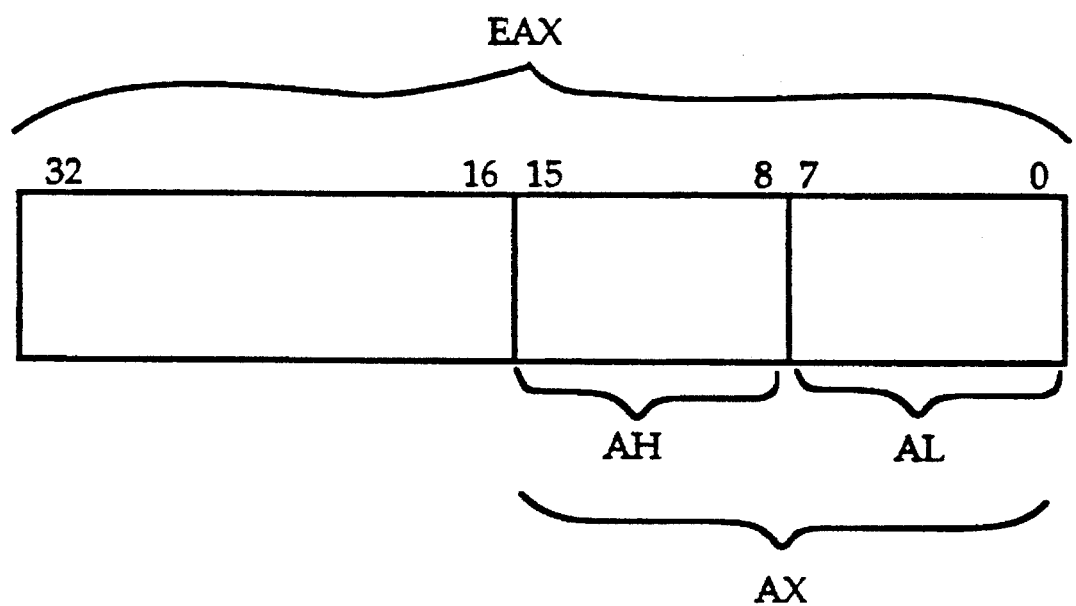
FIG. 5 illustrates one microprocessor architecture register naming convention.

In the Intel Architecture, a general register set of eight registers is used. Four of these registers, EAX, EBX, ECX and EDX, may each be accessed in four different sizes. For example, with reference to FIG. 5, it can be seen that the EAX register is a 32-bit general register. The AX register specifies a 16-bit general register. Note that the AX register physically specifies the lower 16 bits of the same physical 32-bit general register used for the EAX register. Similarly, the AL register specifies an 8-bit general register which is physically the lowest 8 bits of the same physical register used for EAX and AX. Finally, the AH register is an 8-bit register that specifies the higher order 8-bits of the AX register which corresponds to bits [8:15] of the 32-bit physical register used for EAX. Similar relationships exist for the other registers in the Intel Architecture register set. The following discussion with respect to EAX and its subregisters applies equally to the registers EBX, ECX and EDX. The Intel Architecture also utilizes four general registers, EBP, ESP, EDI and ESI, which only come in 32 and 16-bit variations. The discussion below with respect to EAX/AX applies equally to these registers.

Because an out-of-order processor such as the one described above implements register renaming to map a logical destination register to a physical destination register in the reorder buffer, the identity of a logical register's size may be lost. For example, a result specified into AX specifies a 16-bit result while the result into AH specifies an 8-bit result. A problem arises because both the AH or AX registers can be mapped to the same physical register (PDST) in the reorder buffer. From a reorder buffer register, it is impossible to tell what the specified source's data size was for the logical destination as originally embedded within the instruction specifying the source register.

As was described above with respect to FIG. 2, the allocator 112 assigns each incoming micro operation to a location in the reorder buffer (ROB) 40, thereby mapping the logical destination address (LDST) of the micro operation to a corresponding physical destination (PDST) in the ROB. The register alias table (RAT) 114 maintains this mapping. In addition, when a micro operation is written into the reservation station 20, the RAT 114 also provides control signals which are stored with the micro operation in the reservation station.

Figure 6:
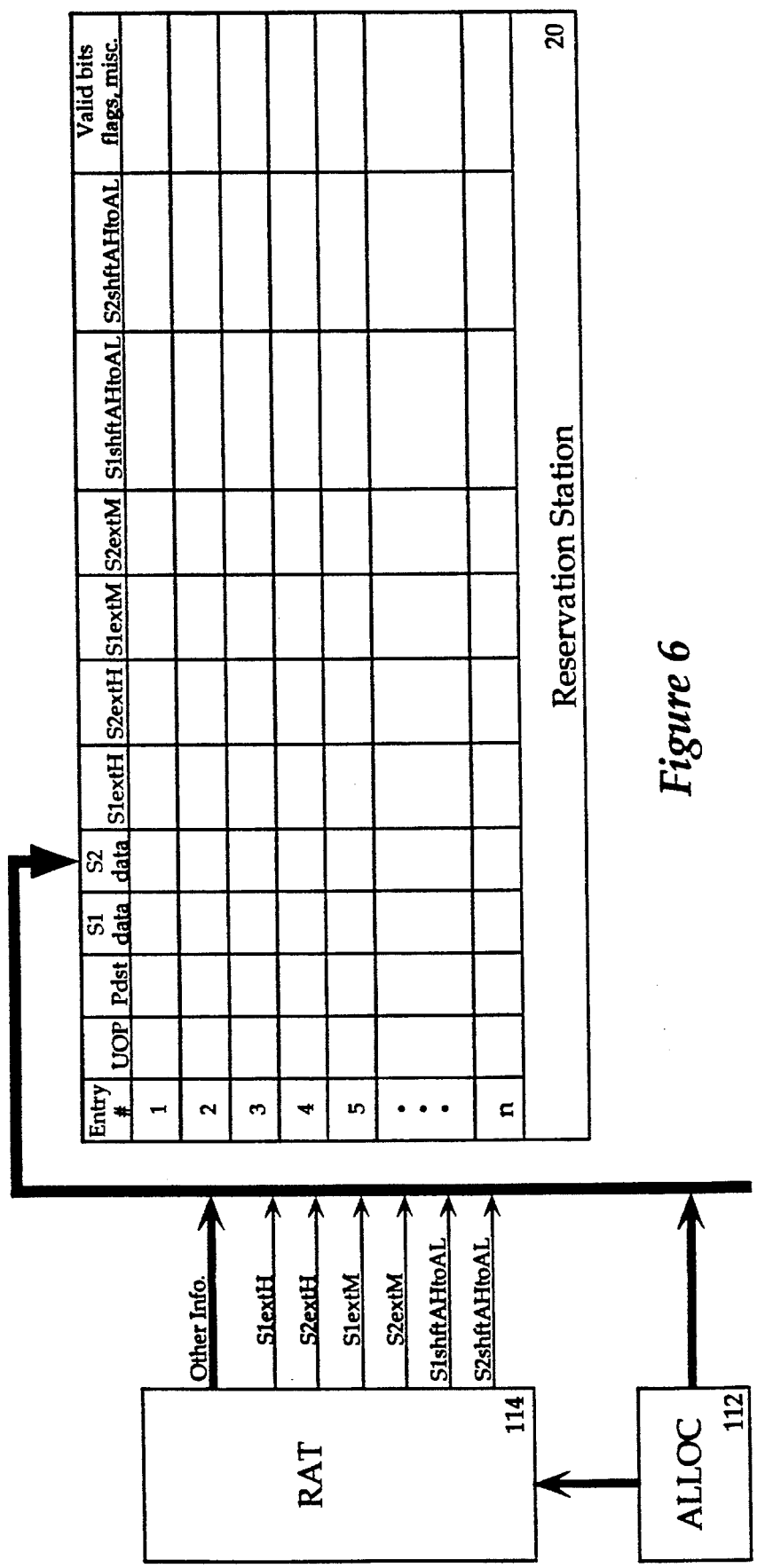
FIG. 6 illustrates the exchange of data transfer control information in accordance with one embodiment of the present invention microprocessor.

Referring now to FIG. 6, control signals relevant to the present invention that are propagated from the RAT 114 with an instruction to the reservation station 20 are shown. For illustrative purposes only, the remainder of this description will assume a general register size of 32 bits is used in the present invention microprocessor. Therefore, a source operand for an instruction may include up to 32 bits of information. Each source input into a functional unit therefore will include 32 multiplexing logic circuits for controlling a particular bit's input as being either from the reservation station, or bypassed from one of the writeback buses. For the description which follows, only a single bit will be discussed at a time, but it should be understood that the various multiplexing logic will be repeated over a relevant range of source data bits to be described.

The control signals shown in FIG. 6 that are propagated from the RAT 114 to the reservation station 20 are signals that will be stored in the reservation station with an instruction and which will be dispatched with an instruction to a designated functional unit. The status of these buffered control signals will determine if certain bit manipulations will be performed by the input multiplexing logic for each source operand bit supplied with its associated instruction. For example, if the following instruction is being carried out:

add AX, BX→AX

It can be seen that two 16-bit sources will be added to generate a 16-bit result to be stored in the AX register upon retirement. The two source operands with the instruction, AX and BX, are both 16-bit sources for the reasons described above with respect to the Intel Architecture register naming convention. Accordingly, the input to the functional unit carrying out the add operation should receive two 16-bit source inputs. Remembering that each source input may include 32 bits, it can be seen that it is desirable for the high order 16 bits, bits [16:31] to be forced to zero on input. This is referred to as zero extending the high order bits of the source input.

For an instruction such as the one described above, the RAT 114 makes the determination that the source 1 and source 2 inputs with the instruction require the high order bits to be zero extended by looking at the identity of the source operands of the instruction. Responsively, the RAT 114 propagates the control signals S1extH and S2extH to the reservation station 20 with the instruction for setting associated control bits within the reservation station.

Figure 7A:
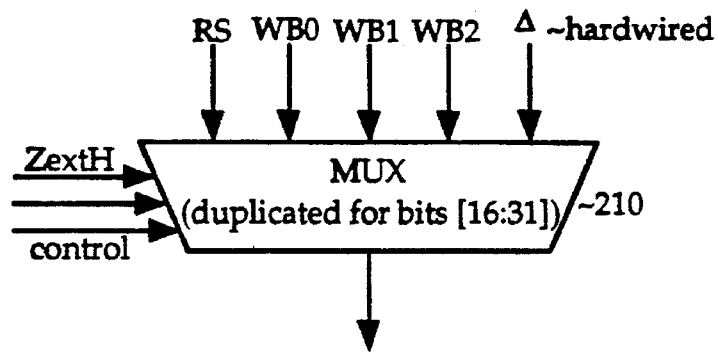
FIGS. 7(a) and 7(b) illustrate circuitry for multiplexing logic to implement zero extension for functional unit source data input.

When the above instruction is dispatched from the reservation station to a functional unit for carrying out the add operation, the control bits stored in response to the S1extH and S2extH control signals are propagated with the instruction to the input multiplexing logic for the functional unit. FIG. 7(a) shows the multiplexing logic 210 which is duplicated for both source inputs for bits [16:31] of all of the functional units implemented in the microprocessor which require high order bit zero extending. The multiplexer 210 is thus one of 16 per source input where two source inputs may be received by each functional unit. The multiplexing logic can receive inputs from the reservation station 20 or from any of the writeback buses as described above with respect to the bypassing functionality. The multiplexing-logic may be incorporated into each functional unit or disposed between the functional units and the instruction dispatch mechanism.

It can be seen that the multiplexing logic 210 incorporated for the high order bits of each source input has another input source: a hardwired zero value. If the multiplexing logic 210 receives a control signal indicating that its associated source input requires a zero input for the high order bits, then the multiplexing logic 210 will select the hardwired zero as input to the functional unit. The control signal to the multiplexing logic 210 is shown as ZextH to represent either source 1 or source 2 zero extension control signals. The source of the ZextH signal is the stored control bit in the reservation station which was set in response to either a S1extH or S2extH signal from the RAT. In alternative embodiments, the zero value may be generated by implemented logic which provides a zero in response to the Zext control signal. Such logic could include an AND gate responsive to a zero value set for the control signal.

If the instruction being dispatched from the reservation station is the following instruction:

add AL, BL→BL it can be seen that two 8-bit sources are expected to generate an 8-bit result for the reasons described above with respect to the register naming convention of the Intel Architecture. In this situation, when the RAT 114 provides control signals to the reservation station 20 with the instruction, in addition to the extH signals being set, the S1extM and S2extM signals are also set. These bits indicate that the middle order 8 bits of the source input are also to be zero extended.

Figure 7B:
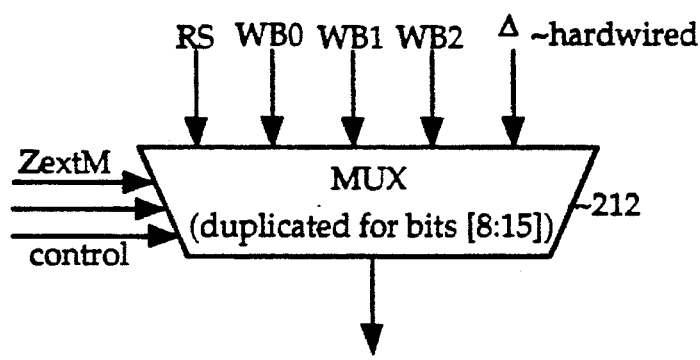

When the above 8-bit instruction is dispatched to a functional unit for executing it, the highest order 16 bits [16:31] are set to zero through the zero extending multiplexing logic as described above with respect to FIG. 7(a). For zero extending the middle order bits [8:15] the multiplexing logic 212 of FIG. 7(b) is implemented. This multiplexing logic is used for all source inputs for bits [8:15]. In response to a ZextM control signal from the reservation station, the multiplexing logic 212 causes the source input for bits [8:15] to choose the zero value for input to the execution unit. Accordingly, for 8-bit operations, both the highest order 16 bits and the next middle order 8 bits are zero extended to provide for an 8-bit source input.

The principles of zero extending as described above with respect to FIGS. 7(a) and 7(b) may also be implemented when a source input to an 86-bit wide floating point functional unit is being bypassed from an integer functional unit which generates a 32-bit wide result. In this situation, input bits [32:85] may include multiplexing logic which provides as an option a hardwired zero input. The multiplexing logic, knowing that a 32-bit result is being bypassed to an 86-bit source input will provide a zero value to the higher order bits. In alternative embodiments, the higher order bits may remain unspecified.

Figure 8:
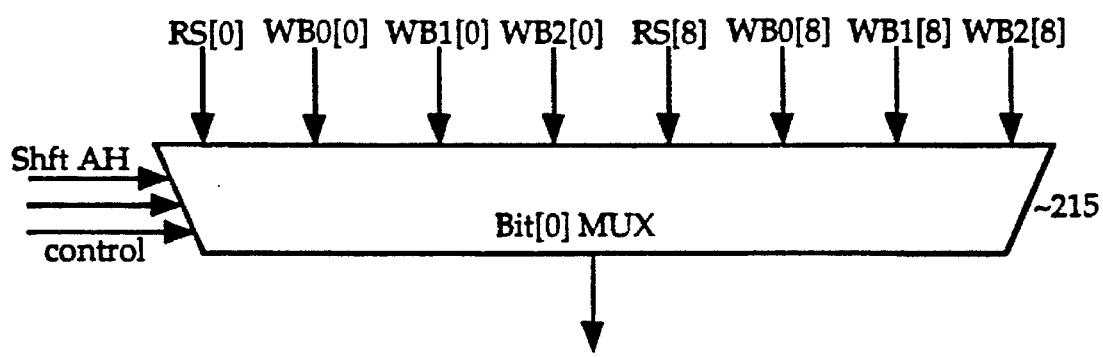
FIG. 8 illustrates multiplexing logic utilized for performing a bit shifting operation for source data input to a functional unit in accordance with one embodiment of the present invention.

For reasons which will be described in detail below, there are certain circumstances in which a source input will require shifting bits [8:15] from where they are stored in a ROB or RRF register into bits [0:7] for input to a functional unit. This operation is referred to as an 'AH shift'. The circumstances under which this occurs will be described more fully below, but when the circumstances are determined to exist by the RAT 114, a control signal for either or both sources which are affected are then supplied to the reservation station 20. If a source 1 input to a functional unit needs be AH shifted, then a control bit S1shftAHtoAL is set with the stored instruction in the reservation station. Similarly, if the source 2 input is to be AH shifted, then a control signal S2shftAHtoAL is provided to the reservation station for dispatch with the instruction. This control signal affects only bits 0 to 7 of a source input to a functional unit. FIG. 8 illustrates multiplexing control logic 215 for bit [0] of either a source 1 or source 2 input. In one embodiment, the multiplexing logic 215 is duplicated for the lowest order 8 bits [0:7] of each source input to each functional unit. The floating point bypass multiplexers may omit this mechanism because in most embodiments an 'AH' value is never a floating point input.

As can be seen from FIG. 8, the bit [0] multiplexing logic 215 receives the [0] bit from either the reservation station or the three writeback buses as described above. In addition, four other inputs are shown as possible choices: either bit [8] from the reservation station or bit [8] from one of the three writeback buses, if the source is being bypassed. If a source input's shftAHtoAL bit is set in the reservation station, an associated control signal shftAH is provided to bits [0:7] for that source input. Thus, for the bit [0] input, the [8] bit from the providing register is supplied. Similarly, the bit [1] input is shifted from bit [9], the bit [2] input is shifted from bit [10], etc. This corresponding relationship covers the bits [0:7] inputs which are shifted from bits [8:15] of the source.

The need to perform an AH shift occurs because all source inputs are right justified and all results are stored right justified within the out-of-order core physical destination registers. The following example illustrates a case in which an AH shift is necessary:

1) move 0xf0f1f2f3→EAX 2) add AH, AH→CH

Note that to perform the second instruction of the above example, both source inputs uses an 'H' register. As described above, the AH register comprises bits [8:15] of the 32-bit EAX register to provide AH as both source 1 and source 2 inputs, where the input has to be right justified, bits [8:15] of the storing register for EAX have to be supplied as bits [0:7] of the source input. Thus, for this situation the RAT 114 of FIG. 6 would set both the S1shftAHtoAL and S1shftAHtoAL bits with the add instruction in the reservation station. It should be noted that whenever an AH shift is to occur, it always corresponds to an 8-bit operation. Zero extending will therefore be required for the high order 16 bits in the next order 8 bits whenever an AH shift is triggered. Accordingly, whenever a source's shiftAH bit is set, the extH and the extM bits will also be set.

The following example illustrates a case in which an operation is performed with an AH register, but where no AH shift is required:

1) move 0xf2→AH 2) add AH, AH→CH

It can be seen that this second instruction is identical to the second instruction of the previous example. However, in this case, the first instruction stored its value directly into AH. As described above, values stored in the general registers of the out-of-order core physical destination registers are always right justified. So, although with respect to retirement registers an AH occupies bits [8:15] of the general register, in the out-of-order core, the designating of a result into AH results in a PDST register in which bits [0:7] contain the Ah value. In this case, when the second instruction is dispatched, the Ah value is already in bits [0:7] and no AH shift is required. Upon retirement, a right justified 'H' value will be returned to bits [8:15] of the receiving register.

From the above description, it can be seen that the determination that an AH shift operation is required is made by determining not only that a source input requires an 'H' source, but also whether or not the last instruction to write the source wrote a purely 'H' value. If the last instruction writing the source register wrote only an 'H' value, then no AH shift is required. On the other hand, if the previous operation wrote an 'X' register or a 'E_X' register, then the 'H' register source will have to be AH shifted. In one embodiment, the RAT 114, in its tables of register mappings, maintains a 2-bit size field indicating the size of the register last written to a specified physical destination register. If the 2-bit size field indicates that the register written was larger than an 8-bit register, then it is known that to use that register as an H input will require AH shifting of bits [8:15]. Note that the discussion above with respect to the AH register applies equally to the BH, CH and DH registers.

There has thus been described a mechanism for preserving register size and location information for use in a microprocessor which implements register renaming. Much of the above discussion has referred to multiplexing logic for determining bit inputs. Those of ordinary skill in the art will recognize that other logic mechanisms may be implemented for performing the bit selection functions. Although the present invention has been described in terms of various embodiments, it will be appreciated by those skill in the art that various modifications and alterations might be made without departing from the spirit and scope of the present invention. The invention should, therefore, be measured in terms of the claims which follow.

What is claimed is:

1. An apparatus for shifting a first plurality of source input data bits upon input to a functional unit comprising:

an instruction dispatch mechanism for dispatching an instruction and source input data to the functional unit, the instruction dispatch mechanism also providing a bit shifting control signal when the source input data is to be shifted upon input to the functional unit;

bit shifting logic disposed between the instruction dispatch mechanism and the front end of the functional unit for shifting said first plurality of source input data bits upon input to said functional unit in response to said bit shifting control signal; and a writeback bus coupled to the functional unit, the writeback bus configured to return result data from the functional unit, the writeback bus directly coupled to the bit shifting logic for bypassing source inputs, wherein said bit shifting logic is further configured to provide zero extended result data as the source input data.

2. The apparatus of claim 1 wherein said source input data comprises said first plurality of bits in a first position and a second plurality of bits in a second position, said bit shifting logic comprising circuitry for shifting said first plurality of bits to said second position.

3. The apparatus of claim 2 wherein said bit shifting logic comprises multiplexing logic wherein said multiplexing logic receives both said first and second plurality of bits corresponding to said first position, said multiplexing logic receiving said bit shifting control signal and selecting said first or second plurality of bits according to said bit shifting control signal.

4. The apparatus of claim 3 wherein said first position corresponds to bits [15:8] of said source input data and said second position corresponds to bits [7:0] of said source data input.

5. The apparatus of claim 3 wherein the instruction dispatch mechanism comprises a reservation station coupled to the functional unit through the bit shifting logic, the reservation station for buffering instructions prior to dispatch and for buffering said bit shifting control signals.

6. The apparatus of claim 5 further comprising a register alias table (RAT) for providing the bit shifting control signal to the reservation station for buffering with an associated instruction, the RAT determining the status for the bit shifting control signal in accordance with the identity of a pending instruction and bit locations of previously stored source data.

* * * * *

UNITED STATES PATENT AND TRADEMARK OFFICE
CERTIFICATE OF CORRECTION

PATENT NO. : 5,615,385
DATED : March 25, 1997
INVENTOR(S) : Fetterman et al.

It is certified that error appears in the above-identified patent and that said Letters Patent is hereby corrected as shown below:

In column 6 at line 19 delete "desired" and insert --designed--

Signed and Sealed this

Twenty-fourth Day of June, 1997

*Attest:*

BRUCE LEHMAN

*Attesting Officer*     *Commissioner of Patents and Trademarks*